(12) United States Patent
Lausenhammer et al.

(10) Patent No.: US 6,355,197 B1
(45) Date of Patent: Mar. 12, 2002

(54) PROCESS AND APPARATUS FOR FORMING PLASTIC ARTICLES

(75) Inventors: Manfred Lausenhammer, Konz Niedermenning; Arnold Mai, Irrel, both of (DE)

(73) Assignee: Husky Injection Molding Systems Ltd. (CA)

( * ) Notice: Subject to any disclaimer, the term of this patent is extended or adjusted under 35 U.S.C. 154(b) by 0 days.

(21) Appl. No.: 09/377,996

(22) Filed: Aug. 20, 1999

Related U.S. Application Data

(62) Division of application No. 09/036,132, filed on Mar. 6, 1998, now Pat. No. 6,146,123.
(60) Provisional application No. 60/044,454, filed on Mar. 20, 1997.

(51) Int. Cl.$^7$ ............................................... B29C 45/23
(52) U.S. Cl. ............... 264/255; 264/297.2; 264/328.8; 264/328.9; 264/338; 425/130; 425/562
(58) Field of Search ........................ 264/328.9, 161, 264/297.2, 328.8, 255, 338; 425/562, 564, 566, 570, 130

(56) References Cited

U.S. PATENT DOCUMENTS

| | | | | | |
|---|---|---|---|---|---|
| 4,073,944 | A | * | 2/1978 | Dawson | 425/146 |
| 4,077,760 | A | * | 3/1978 | Sauer | 425/562 |
| 4,099,904 | A | * | 7/1978 | Dawson | 425/563 |
| 4,712,995 | A | * | 12/1987 | Basnett | 425/562 |
| 4,787,840 | A | * | 11/1988 | Gellert | 425/549 |
| 4,919,606 | A | * | 4/1990 | Gellert | 425/549 |
| 5,127,819 | A | * | 7/1992 | Wright | 425/549 |
| 5,499,916 | A | * | 3/1996 | Schad et al. | 425/564 |
| 5,922,363 | A | * | 7/1999 | Beck et al. | 425/130 |

* cited by examiner

*Primary Examiner*—Jan H. Silbaugh
*Assistant Examiner*—Stefan Staicovici
(74) *Attorney, Agent, or Firm*—Bachman & LaPointe, P.C.

(57) ABSTRACT

At least one mold is provided having a mold cavity and a mold gate communicating with the mold cavity, an injection nozzle for feeding molten plastic material to the injection mold having a nozzle outlet in line with the mold gate, and a thin movable valve gating arrangement positioned between the mold gate and nozzle outlet having an orifice therein permitting and shutting off flow of molten plastic from the nozzle to the mold.

17 Claims, 13 Drawing Sheets

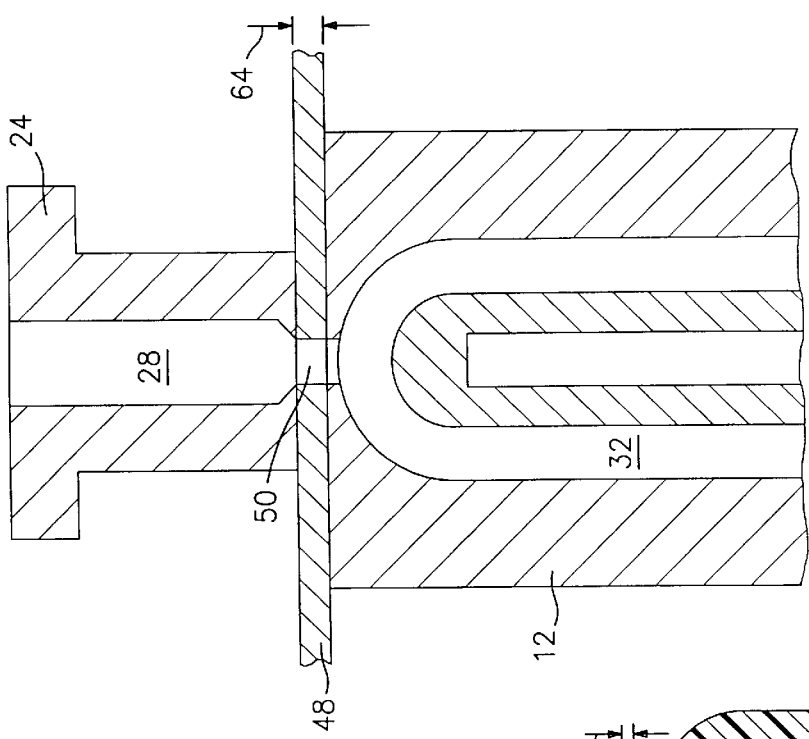
FIG. 3
FIG. 4
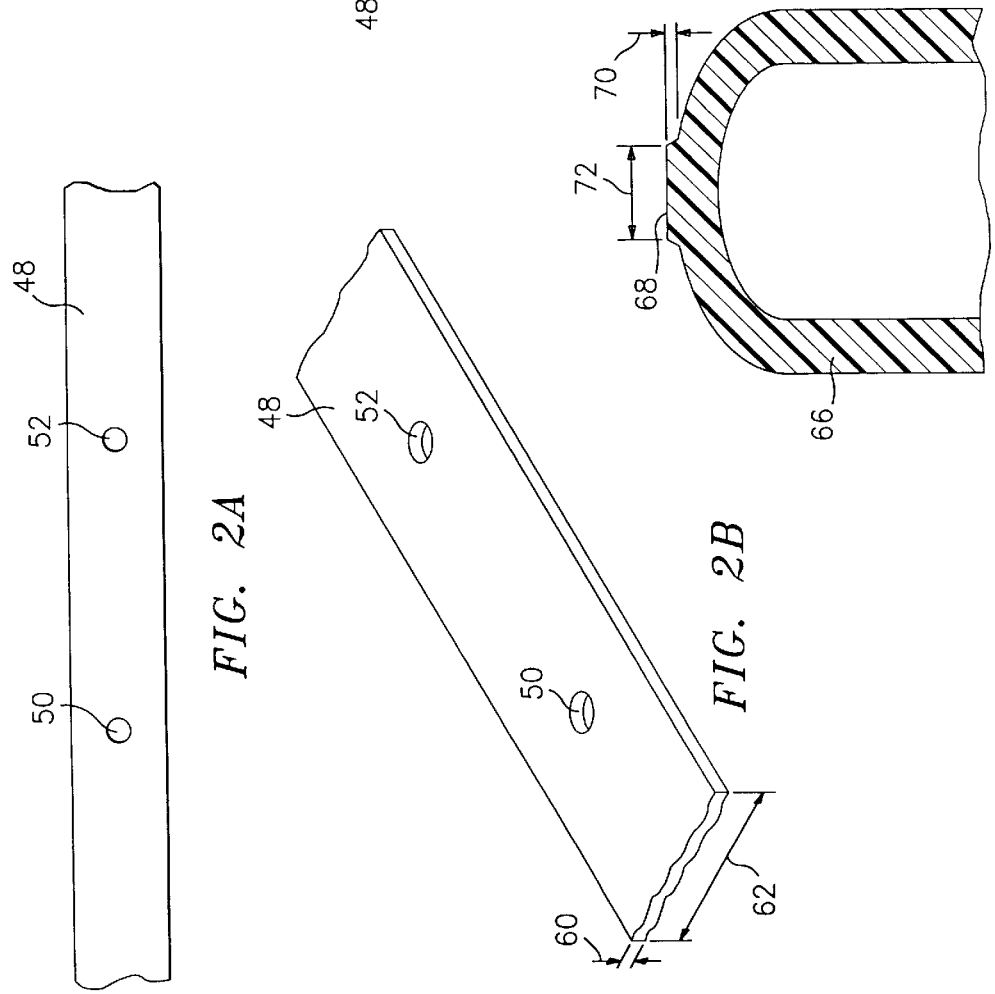
FIG. 2A
FIG. 2B

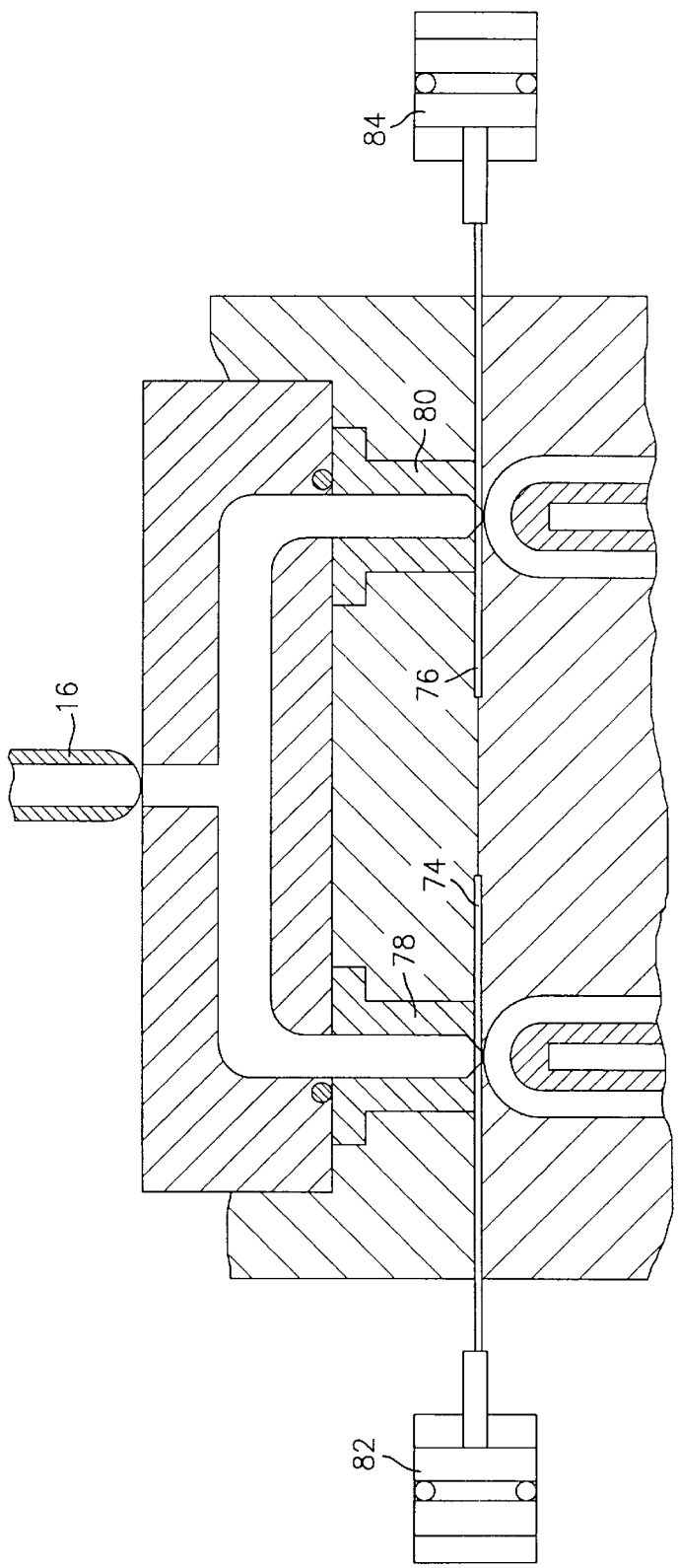
FIG. 5C
FIG. 5B
FIG. 5A

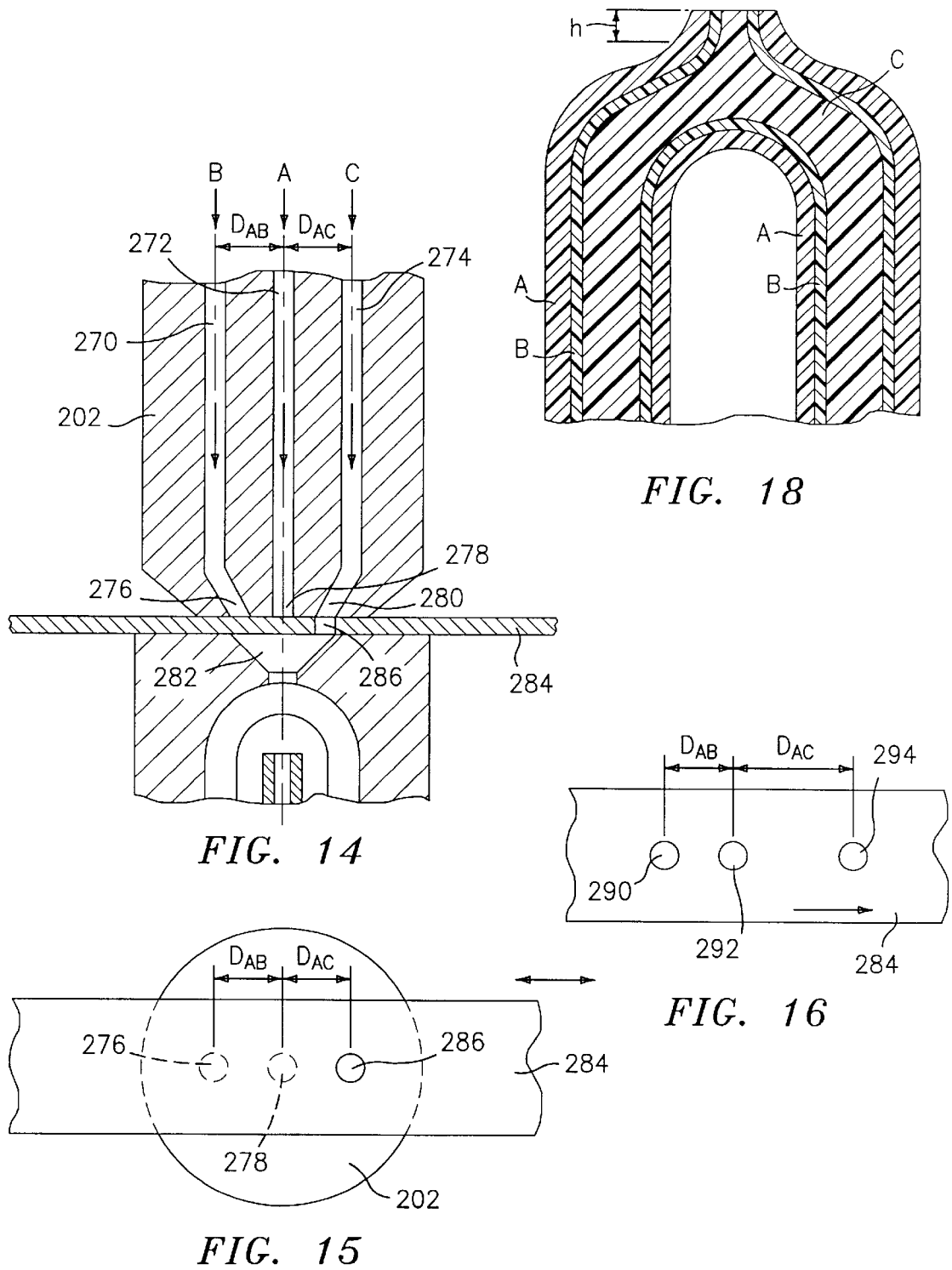

US 6,355,197 B1

PROCESS AND APPARATUS FOR FORMING PLASTIC ARTICLES

CROSS-REFERENCE TO RELATED APPLICATION

This is a Division, of application Ser. No. 09/036,132, filed Mar. 6, 1998, now U.S. Pat. No. 6,146,123 which claims the benefit of U.S. Provisional Application No. 60/044,454 filed Mar. 20, 1997.

BACKGROUND OF THE INVENTION

This invention relates to an improved process and apparatus for forming articles from molten materials including an innovative mold valve gating apparatus and a mold valve gating method useful for injection molding articles of various shapes.

Various valving arrangements have been proposed in the prior art for regulating the flow of heated plastic material from a source of such material to a mold cavity space. In most instances, regulation of the flow of the melt between a hot runner or cold runner nozzle, through a mold gate and into the mold cavity space, is satisfactorily achieved using a valve stem located in the melt channel of the nozzle. The valve stem is actuated by a motive means, typically located in the mold back plate, to open and close the access of the melt to the mold cavity space. This approach has several drawbacks when it has to be applied to a multicavity mold used to form demanding articles, such as blowable preforms, molded using single or multiple materials. One drawback is where the system requires the use of multiple valve stems. In such an arrangement, the individual actuation of the stem creates problems when it comes to ensuring that all the valve stems are opened and closed simultaneously. Second, the valve stem has the tendency to split the flow of molten material, thus creating the so called unacceptable knit lines. Additionally, the actuation of the stems becomes very problematic for multimaterial injection nozzles when at least two materials are injected in the same cavity space. One known approach intended to solve the first two problems is to use a lateral valve gating arrangement comprising a gate orifice. A gate orifice is shown in U.S. Pat. No. 4,108,956 to Lee.

The approach shown in the Lee patent is not very effective. While it solves the first and second aforementioned drawbacks, it does not simplify the mold design and operation. In fact, the approach complicates both mold design and operation. The valving arrangement shown in Lee involves the use of a reciprocally movable slide member having at least one opening. The slide member is interposed between a source of heated plastic material such as a hot runner outlet or injection nozzle and a mold gate. As can be seen in both of these patents, the movable valve carries with it a hot slug of the plastic material being molded as the valve moves from a valve open to a valve closed position. During the cooling step, the slug is solidified. The presence of such a slug in the valve opening requires the apparatus to include some additional and specialized mechanism for removing it from the valve opening. Should the plug not be ejected from the valve opening, it will be brought back to the gate area and injected into the cavity space with the next shot. In many applications, this is not acceptable as it lowers the cosmetic and strength characteristics of the molded article. This aspect becomes even more critical in multimaterial molding where mixing two or more different materials must be avoided.

In the Lee Patent, a movable mechanical ejection unit actuated by pneumatic means (that is as complicated as the similar means used to move a classical valve stem) is positioned on the molding machine to remove the cold slug from the valve opening. Other means, not shown by Lee, must be further used to remove the slugs from the mold. The use of such means becomes very difficult in systems utilizing a multicavity mold, such as the molds having more than sixteen cavities manufactured by the assignee of the instant application. For example, the molds would become very big and heavy if they had to accommodate movable mechanical ejection devices. Further, additional detection means would be needed to make sure that the slug has been indeed ejected from each opening.

A machine, such as that shown in the Lee Patent, is further economically disadvantageous in that the slug is wasted material that could otherwise be used to fabricate molded articles. In addition to the slug removal and waste problems, these systems must face the potential problem of having molten plastic material flow between the surfaces of the valve and the adjacent mold plate and hot runner housing. Should molten plastic material flow between these surfaces and reside therein, operation of the valve and the machine itself could be interrupted if the plastic material solidifies.

The latter valve gating arrangement of Lee has been previously used to control flow of the melt from the machine injection nozzle to a mold as shown in U.S. Pat. No. 3,632,729 to Bielfeldt. Certainly, the valving arrangement shown in the Lee patent was not conceived to be used or adapted for valve gating a multimaterial injection nozzle such as that disclosed in U.S. Pat. Nos. 4,863,665; 5,200,207; 5,143,733; 5,112,212; 4,863,369; 4,808,101; 4,775,308; 4,717,324; 4,701,292; and 4,657,496, all assigned to the assignee of the instant application and all which are hereby incorporated by reference herein. Lee's approach would not be useful in multimaterial molding because it would generate too much waste made of various materials. Further, the need to handle more than one type of slug would become prohibitive both technically and price-wise.

It is also known in the prior art to remove a crystallized gate vestige from a parison (preform) by using reciprocally movable cutting blades. Such a system is shown in U.S. Pat. No. 4,380,423 to Aoki. While the Aoki patent addresses the problem of removing the sprue from the already molded article, it does not address the critical problem of how to open and close off the flow of molten material from a hot runner system to a mold gate without forming the crystallized gate vestige that needs to be cut in a post molding operation. Similar to Lee's slug, the crystallized gate vestige shown by Aoki represents a significant waste of valuable resin, incurring the problems previously mentioned.

There remains a need for a simpler and more efficient mold valve gating arrangement for a multimaterial injection nozzle. There also remains a need for a mold valve gating arrangement for injecting multiple or single materials wherein the flow of molten material from a hot or cold runner system or injection nozzle to a mold gate can be interrupted without incurring waste of the material being molded. There further is a need for a mold valve gating arrangement which does not require the inclusion of a movable and/or a mechanical ejection unit for removing plastic material being molded from the valve.

SUMMARY OF THE INVENTION

A principal object of the present invention is to provide a simpler and more effective valve gating apparatus and method for operating a hot or cold runner injection nozzle that is easier to manufacture, operate and service to injection mold improved articles.

Another object of the present invention is to provide a valve gating apparatus and method wherein the valve gating means is located outside of the injection nozzle.

Another object of the present invention is to provide a valve gating apparatus and method wherein a thin, movable blade including a gate orifice of minimal volume having a fixed aperture is used in lieu of a valve gate stem.

Another principal object of the present invention is to provide a valve gating apparatus and method wherein substantially no material is diverted from the stream of molten material by the movable gate orifice during the injection process.

Another principal object of the present invention is to provide a simpler and more effective valve gating method and apparatus for single material and multimaterial molds having the aforementioned attributes.

Another object of the present invention is to provide an apparatus and method of molding plastic articles made of single or multiple materials with substantially no gate vestige.

Another object of the present invention is to provide an apparatus and a method of molding plastic articles made of single or multiple materials with no crystallinity.

Another object of the present invention is to provide an apparatus and a method of molding plastic articles with no knit lines.

The present invention is carried on in a mold having one or more injection nozzles which guide at least one stream of molten material desirably having a tubular flow pattern towards one or more cavity spaces. More particularly this invention discloses thin movable valve gating arrangements located outside the single material or multimaterial injection nozzle and a method of valve gating a mold where substantially no material is diverted from the molten stream during the transfer of the molten material from the single material or multimaterial injection nozzle to the mold cavity space. Accordingly, substantially no residual material is generated by the movement of the valve gating means. Numerous advantages are obtained in accordance with the present invention and by having substantially no residual slug of material in the mold. For example, the mold is much simpler to design and manufacture having less mechanical or movable parts, easier to build, operate, and service and no additional equipment is needed to eliminate or cut the sprue after molding the article. In addition, almost no molten material is wasted and thus the mold can be operated in a smaller, clean room environment. Still further, the molded article has a higher mechanical resistance and higher aesthetic value.

In accordance with the present invention, an apparatus for forming molded articles is provided which broadly comprises: an injection mold having one or more mold cavity spaces and mold gates communicating with the mold cavity spaces; one or more injection nozzles for feeding molten plastic material to the injection mold cavity space(s) having at least one nozzle outlet therein in line with the mold gates; movable valve gating means, such as a blade, is positioned between the mold gate and the at least one nozzle outlet and has an orifice therein, with the orifice having a minimum volume; means for moving the valve gating means between a first position wherein the orifice communicates with the nozzle outlet and with the mold gate and permits the flow of molten plastic from the at least one outlet to the mold gate, and a second position blocking flow from the at least one nozzle outlet to the mold gate, and the valve gating means being sufficiently thin that during movement of the valve gating means between the first and second positions substantially no plastic material is carried or diverted by the valve gating means.

In accordance with the present invention, a method for forming molded articles is provided which comprises the steps of: feeding at least one molten material from an injection nozzle via at least one nozzle outlet to a mold cavity space of an injection mold through a mold gate substantially in line with the at least one nozzle outlet; and substantially preventing waste of the molten plastic material during molding by positioning a thin, movable valve gating means, with an orifice therein, between the mold gate and the at least one nozzle outlet and moving the valve gating means between a first position wherein the orifice communicates with the at least one nozzle outlet and mold gate and permits the flow of molten plastic from the at least one nozzle outlet to said mold gate, and a second position blocking flow from the at least one nozzle outlet to the mold gate, without substantially any of the molten plastic material being transferred by the thin valve gating means during movement of the valve gating means between the first and second positions.

The apparatus and the method of the present invention have been found to have particular utility in injection molding systems which include multimaterial injection nozzles for injecting two or more materials into a mold cavity space. The valve gating means of the present invention may be designed to permit sequential ejection of the materials into the mold cavity space or simultaneous ejection of the materials into the mold cavity space, all while being thin enough that the valve gating means carries substantially none of the material being molded as it moves between various positions and generates no residual material which must be disposed of. When injecting multiple materials, valve gating means in accordance with the present invention may have more than one gate orifice.

In accordance with a further aspect of the present invention, the valve gating means is desirably positioned very close relative to the mold cavity space so that the height of the residual sprue or gate vestige is minimum. In accordance with another aspect, the gating means is desirably maintained at a temperature so that substantially no crystallinity is generated in the area of the molded article adjacent to the mold orifice or gate. When injecting materials such as PET, no knit lines are formed in the molded article. The valve gating means could be a single blade, which is preferably flexible, plural blades moved in opposite directions, a disk member, or a cup-shaped member. Various actuation means for moving the valve gating means, individually or all together, may be provided on one side or on both sides of it. In addition, since no valve stem resides inside the melt channel of injection nozzle in the present invention, the molded article does not have knit lines and a much faster injection cycle can be achieved.

Further features of and advantages of the present invention will appear hereinbelow.

BRIEF DESCRIPTION OF THE DRAWINGS

The present invention will be more readily understandable from a consideration of the accompanying drawings, wherein:

FIGS. 2A and 2B are top and perspective views, respectively, of a valve blade in accordance with the present invention;

FIG. 3 is an enlarged, detailed view of a nozzle, blade and mold of the present invention;

FIG. 4 is a partial sectional view of a molded article preform prepared in accordance with the present invention;

FIGS. 5A, 5B and 5C show an alternate embodiment of the present invention with individual valve gating means acting on each mold cavity;

FIG. 14 is a sectional view of a three-material nozzle used in the embodiment of FIG. 13;

FIG. 15 is a bottom view of a valve gating blade which can be used with the three-material nozzle of FIG. 13;

FIG. 16 illustrates an alternative embodiment of a valve gating blade which can be used with the three-material nozzle of FIG. 13;

FIG. 18 is a sectional view of a three material preform fabricated using the system of FIG. 13;

DETAILED DESCRIPTION OF PREFERRED EMBODIMENTS

Figure 1:
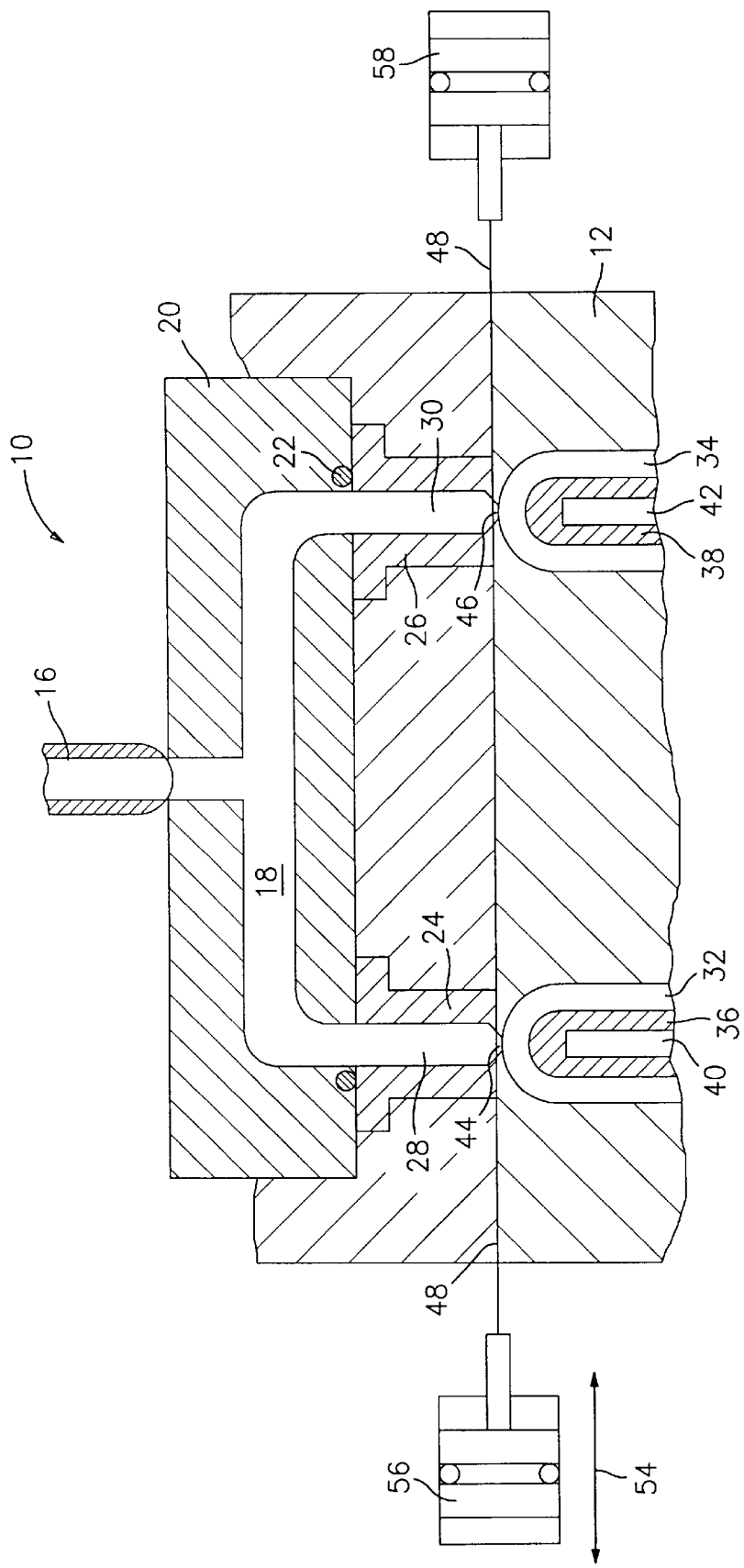
FIG. 1 is a sectional view of a multicavity mold system in accordance with the present invention.

In accordance with a preferred embodiment of the present invention, the valve gating means is a novel flexible, thin valve blade which is preferentially actuated using novel motive means operational at both ends of the blade. The motive means pull the blade and the gate orifice therein in and out of alignment with a mold gate and an injection nozzle outlet. In this manner, no axial, mechanical, or compression stress is generated in the valve gate during the sliding movement of the valve blade. In another embodiment of the present invention, the valve gating means is formed by a slightly more rigid, thin valve blade which is preferentially actuated using motive means operational at one end of the valve blade only. This is recommended for viscous materials which have less adherence to the blade or low cavitation molds. The sliding movement of the valve blade takes place in a plane which is generally perpendicular to the flow of the molten material, such as a resin, and to the mold gate. The mold gate opening has an axis generally parallel to the flow of molten material.

In accordance with the present invention, the valve gating means does not carry substantially any of the material being molded as it moves between positions. To achieve this goal, the gating valve means must have a minimal thickness. The minimal thickness is chosen so that each orifice in the valve gating means retains a minimal volume of material, and preferably no material. The volume (V) of material accumulated by the gate orifice having a diameter (D) during its lateral movement can be determined with the formula:

$$V = \frac{\pi D^2}{4} T$$

In order to retain substantially no molten material that becomes a cold slug during cooling of the mold, the volume of the orifice has to be minimum. This is achieved in at least three ways: the diameter D is minimum, the thickness T of the blade at the gate area is minimum or they are both minimum. For practical considerations that take into account that the diameter of the orifice cannot have but a certain value, the choice is to have a blade of a thickness that is sufficient to prevent formation of the slug. Therefore the actual thickness of the blade is determined by the equation (1):

$$T_{min} = 4V_{min}/(\pi D^2) \tag{1}$$

where $T_{min}$=minimal thickness;

$V_{min}$=minimal volume of orifice; and

D=diameter of the orifice.

Using the same practical approach, we also mention that the thickness of the blade T at the gate area should be in most cases smaller than the diameter D of the orifice.

$$T_{min} < D_{min}$$

The thickness $T_{min}$ of the valve gating means shuts off a stream of hot molten plastic material substantially without creating a waste slug and without transferring said molten material as the valve gating means moves between open and closed positions. The valve gating means may have a thickness of from 0.01 to 2 mm. Experiments using various molten materials, various injection molding parameters, various actuation means, various materials for the blade and various mold designs have shown however that a valve gating means having a thickness of less than 0.3 mm insures that substantially no material is retained by an orifice in the valve gating means.

In accordance with the present invention, actuation pistons pull the valve blade in either one or two directions during the opening and closing of the gating sequence. The slidable valve blade of the present invention may effectively be used in a multicavity mold where it is operative to shut off all melt channels simultaneously.

As is known in the art, injection molds have in general two types of methods of blocking the communication between the nozzle and the mold cavity. In the so called thermal gating approach, the flow of molten resin to the mold cavity is interrupted by "freezing" the mold gate area after the injection step and prior to opening the mold. In the so called valve gating approach, a movable valve gate stem located in the melt channel is actuated to open and shut off the gate. Both methods have several drawbacks. In thermal gating, the size of the mold gate is limited to small diameters to allow cooling of the gate. Also the operating temperature and pressure windows are limited to domains that do not cover a large number of applications. In valve gating, the presence of the stem in the melt channel generates the so called knit lines in the molded product. They cannot be effectively used for several applications, especially when it comes to molded articles where the so called gating vestige has to be very small and has to have substantially no crystallinity.

FIG. 1 shows a multicavity injection mold assembly 10 having a mold cavity plate 12 and a mold core plate (not shown). The mold cavity plate 12 may include one or more mold cavity spaces 32 and 34. Machine nozzle 16 feeds a molten material to a hot runner channel 18 located in manifold 20. The nozzle 16 and/or the manifold 20 may include a plurality of heating elements 22 to maintain the proper temperature of the plastic material in the hot runner channel. Hot runner channel 18 feeds molten plastic material to injection nozzles 24, 26 which contain melt channels 28, 30, respectively. Mold cavity spaces 32 and 34 are formed by the mold cavity plate 12 and mold cores 36 and 38 respectively. Cooling channels 40, 42, respectively, fed by a cooling medium from a source (not shown), are used to solidify the molten material. The remainder of the mold assembly components are well known in the art and are not shown herein.

Injection nozzles 24, 26 feed molten plastic to mold cavities 32, 34 through mold gates 44, 46, respectively.

Sliding valve blade 48, shown in detail in FIGS. 2A and 2B, including orifices 50, 52 therein is provided between injection nozzles 24, 26 and mold cavity spaces 32 and 34. Blade 48 slides laterally in the directions of arrow 54 actuated by cylinders 56, 58 on both sides of blade 48 to open communication between melt channels 28, 30 and mold cavities 32, 34 when blade orifices 50, 52 are in line with their respective melt channels and mold cavities, and to close said communication when not in line therewith.

The thickness 60 of blade 48 is minimum, generally from 0.02 to 2 mm, so that no plastic material (cold slug) is diverted after the injection process when the blade is sliding to close the gate. The width 62 of blade 48 will depend on particular mold design configurations. The limited clearance 64 (see the enlarged view of FIG. 3) between nozzle 24 and mold 12 permits blade 48 to slide between the nozzle and mold but prevents any leakage of plastic material during injection. The blade is flexible, but due to the fact that it is held on both ends, it is held in a rigid state and does not bend during its sliding movement.

As shown in FIG. 4, the resultant molded plastic article 66 contains substantially no gate vestige 68 with a minimal thickness 70 and width 72.

In the embodiment of FIG. 5A, shorter individual blades 74, 76 are used to open and close individual nozzles 78, 80, each individually actuated from one side only by individual cylinders 82, 84. FIGS. 5B and 5C show top views of the individual blades 74, 76 with their orifices 86, 88. The shorter, individual blades are less flexible and can readily be actuated from one side only.

Figure 6A:
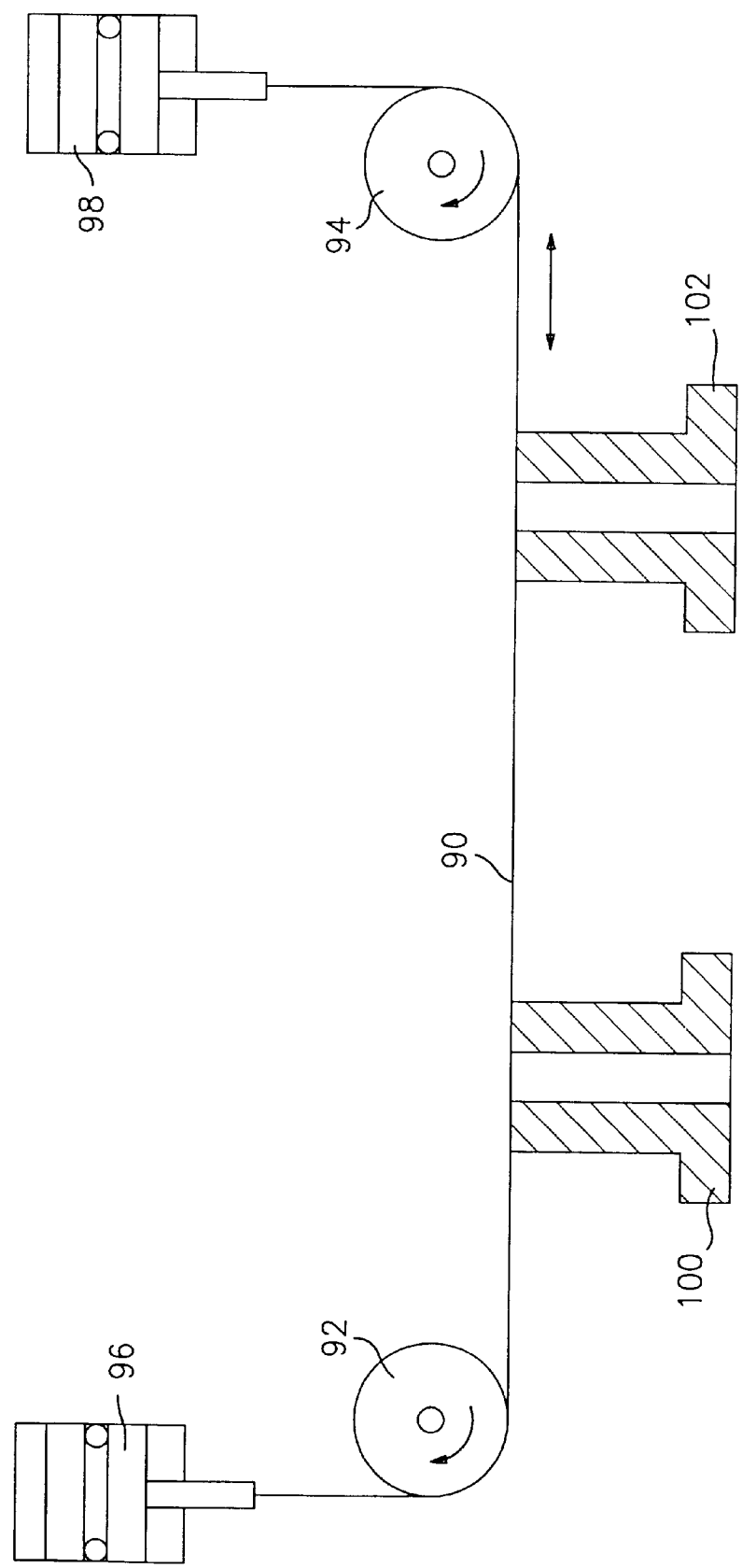
FIG. 6A shows an alternate embodiment of a valve gating arrangement in accordance with the present invention.

FIG. 6A shows an alternate, compact embodiment with a single blade 90 passing over rollers 92, 94 and actuated by cylinders 96, 98. The other components are not shown in FIG. 6A. The benefit of this actuation approach is that the piston is perpendicular to the mold separation line which reduces the size of the mold.

Figure 6B:
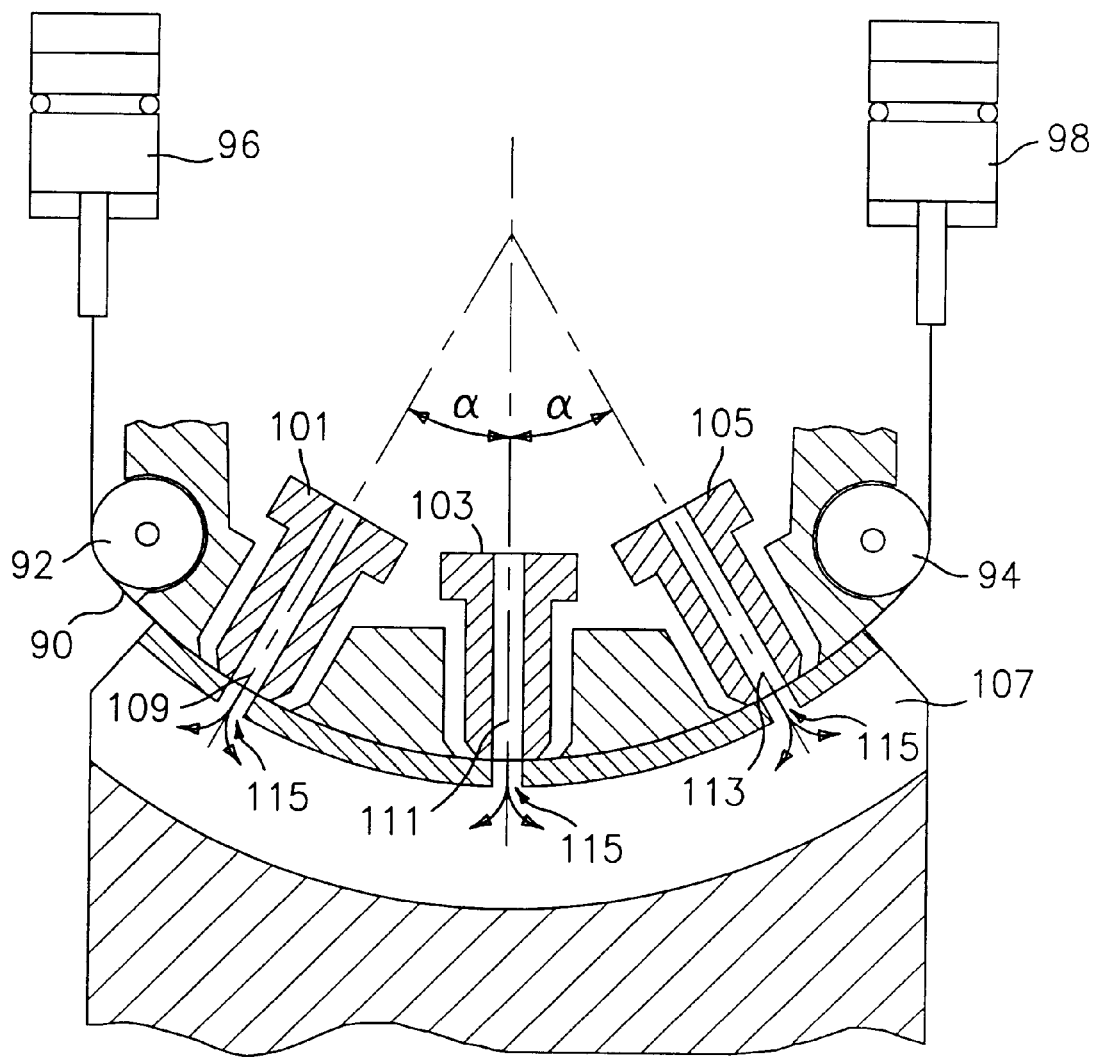
FIG. 6B shows a valve gating arrangement in accordance with the present invention for use in a multi-injection nozzle system.

FIG. 6B shows yet another alternate, compact embodiment in which a single blade 90 passes over rollers 92, 94 and actuated by cylinders 96, 98. In this embodiment, there are three injection nozzles 101, 103, and 105 for feeding molten material into a single, large, curved cavity space 107 through three spaced apart mold gates 115. The blade 90 is provided with three orifices 109, 111, 113 for alignment with the outlets of the injection nozzles 101, 103 and 105 and the corresponding mold gates 115 to permit the simultaneous flow of molten material into the cavity space 107. This is recommended for large parts having a curvature such as car bumpers.

Figure 7A:
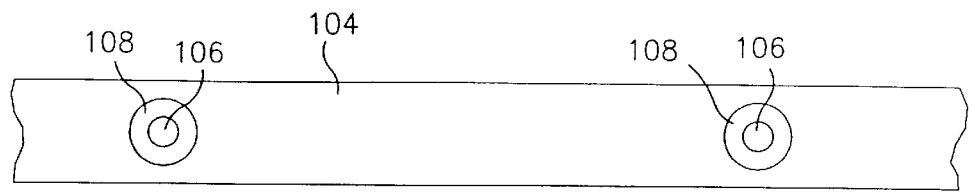
FIGS. 7A–7D show alternate blade configurations of the present invention.
Figure 7B:
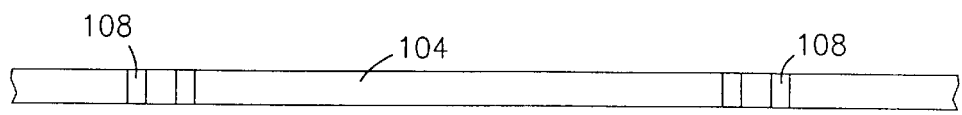

FIGS. 7A–7D show alternate blade configurations. FIG. 7A shows a top view and FIG. 7B shows a side view of blade 104 having orifices 106, with each opening lined with a material 108 which is different from the material of the blade to obtain different characteristics.

Figure 7C:
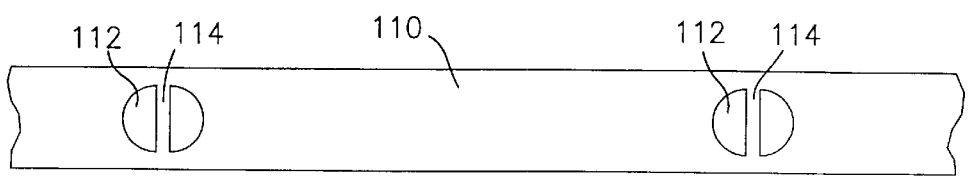
Figure 7D:

FIGS. 7C and 7D show top and side views of blade 110 with orifices 112 including divider 114 therein to provide a split orifice therein that allows its use for injecting more than one material into a single mold cavity.

Figure 8:
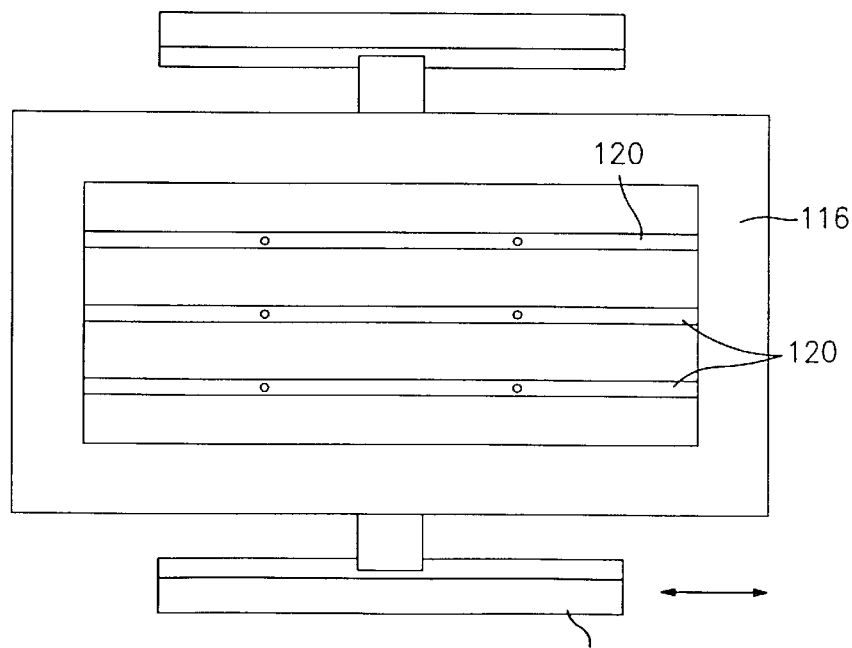
FIG. 8 shows a frame assembly for carrying multiple blades which move simultaneously.
Figure 9A:
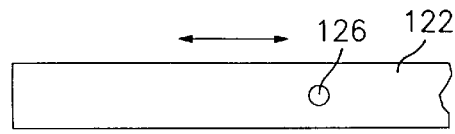
FIGS. 9A–9D show alternate embodiments of the present invention.
Figure 9C:
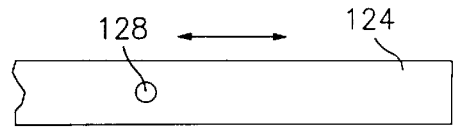
Figure 9B:
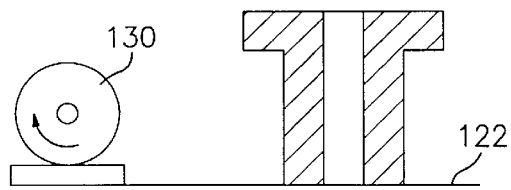
Figure 9D:
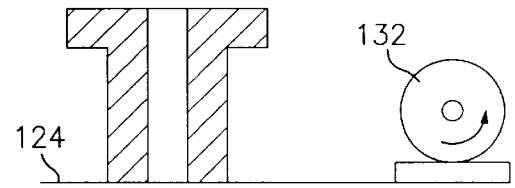

In the embodiment of FIG. 8, a frame 116 carried by rack 118 moved by a pinion (not shown) carries multiple blades 120 that move back and forth with the frame for a plurality of molds.

FIGS. 9A–9D show a different mechanism for actuating blades 122, 124 having orifices 126, 128 using mechanical means, such as frictional gears, rather than pneumatic means, as with motors 130, 132.

Figure 10:
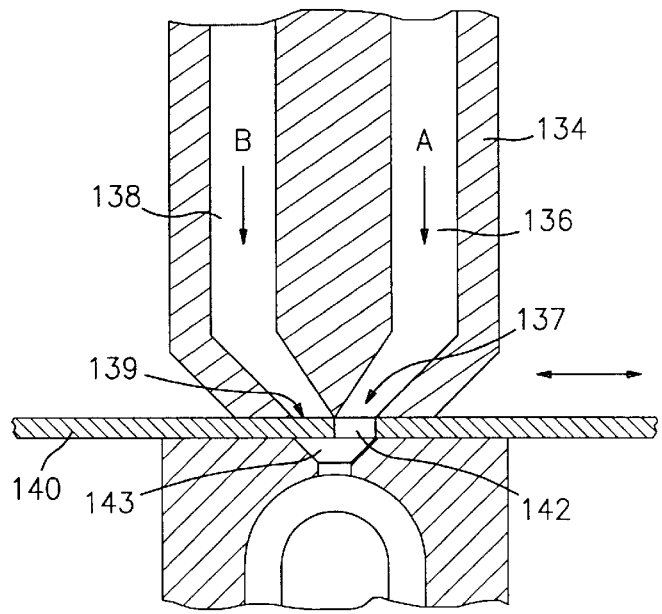
FIG. 10 shows a still further embodiment useful for feeding two materials sequentially or coinjection.

The embodiment of FIG. 10 shows nozzle 134 having two channels 136, 138, for different plastic materials A and B respectively and nozzle outlets 137 and 139. The blade 140 has a single opening 142. The blade 140 is moved so that the orifice 142 is aligned with the outlet 137 and the mold gate 143 in a first position and is aligned with the outlet 139 and the mold gate 143 in a second position. The blade 142 is further movable so that the orifice 142 is not aligned with either outlet 137 or outlet 139. This arrangement allows for feeding material A and then feeding material B. The blade 140 may be moved using any of the mechanisms described hereinbefore. Alternatively, the blade 140 could be positioned so that materials A and B are simultaneously fed into mold gate 143 via orifice 142. In most applications, one material forms the core and the other the skin. In preform applications, one material could be virgin PET, while the other is recycled PET.

Figure 11:
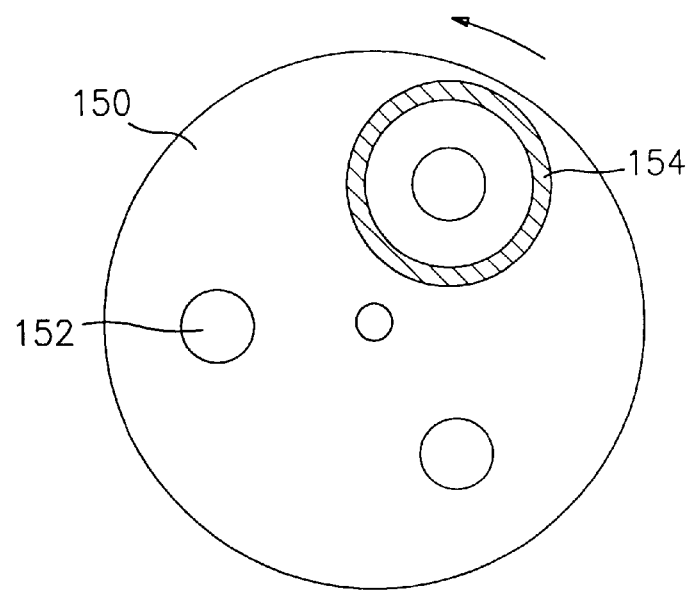
FIG. 11 is a top view of a disc shaped valve gating arrangement.

In lieu of a blade, the valve gating means may be a gating disk 150 such as that shown in FIG. 11. As before, the gating disk 150 is positioned between a nozzle outlet 154 and a mold gate (not shown). The gating disk 150 may have one or more orifices 152. The number of orifices 152 depends upon the number of nozzle outlets and mold gates with which the gating disk 150 cooperates. Where the disk 150 has multiple orifices 152, the orifices may be used to valve gate a single injection nozzle or to valve gate simultaneously more than one nozzle. Further, where the disk 150 has multiple orifices 152, the orifices may be of different sizes. The diameter of the gating disk 150 is determined by the arrangement of the nozzle outlets and the mold gates with which it must cooperate.

In operation, the gating disk 150 is preferably rotated between a first position wherein the orifice(s) 152 are aligned with the nozzle outlet(s) and the mold gate(s) to allow molten plastic material to flow from the nozzle outlet(s) to the mold cavity space(s) via the mold gate(s) and a second position where the orifice(s) are not aligned with the nozzle outlet(s) and the mold gate(s). Any suitable means (not shown) known in the art may be used to rotate the gating disk 150 between the first and second positions. For example, a rack and pinion mechanism may be used to actuate the disk 150. A limited clearance is provided between each injection nozzle outlet and the mold gate so as to permit the member 150 to rotate without leakage of the molten plastic material.

The thickness of the disk shaped member 150 is determined by the aforementioned equation. The disk shaped member 150 is sufficiently thin that during movement of the member between the first and second positions substantially no plastic material is carried by the disk shaped member and that no slug of plastic material is formed in the orifice(s) 152. In this way, there is no waste of the molten plastic material. There is also no plastic material which can get between components and interfere with the operation of the disk shaped member.

Figure 12:
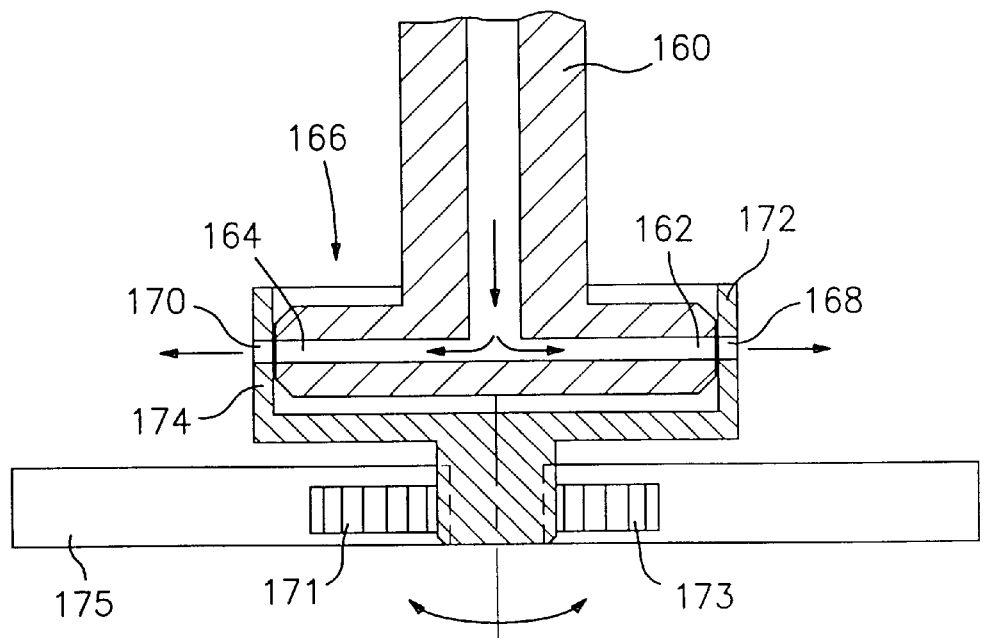
FIG. 12 is a sectional view of an edge gating nozzle and rotational valve gating arrangement.

FIG. 12 illustrates another embodiment of the present invention use to valve gate an edge gating nozzle 160 having one or more outlets 162, 164 positioned perpendicular to the main flow of the molten material. In this embodiment, the valve gating means comprises a rotatable cup-shaped gating member 166. As shown in FIG. 12, the gating member 166 includes orifices 168 and 170 in side walls 172 and 174. Each orifice 168, 170 communicates with a respective one of the outlets 162 and 164 and a respective mold gate (not shown).

The gating member 166 is preferably rotated between a first position wherein the orifices 168, 170 are aligned with the nozzle outlet 162 and 164 and the mold gates to allow molten plastic material to flow from the nozzle outlets to the mold cavity spaces via the mold gates and a second position where the orifices 168, 170 are not aligned with the nozzle outlet 162, 164 and the mold gates. Any suitable means known in the art may be used to rotate the gating member 166 between the first and second positions. For example, an elongated actuation blade 175 having a rack portion 173 may be provided. The rack portion 173 engages a pinion 171 connected to the gating member 166. Suitable means (not shown) are connected to the blade 175 to move it back and forth and thereby rotate the gating member 166 via the action of the rack 173 and pinion 171. In a multicavity mold, each nozzle 160 is surrounded by a gating member 166 and the actuation blade 175 will interact with the pinion 171 of each gating member 166. A limited clearance is provided between each injection nozzle outlet and the mold gate so as to permit the gating member 166 to rotate without leakage of the molten plastic material.

The thickness of each sidewall 172, 174 is determined by the aforementioned equation. Each sidewall is sufficiently thin that during movement of the gating member 166 between the first and second positions substantially no plastic material is carried by the sidewalls and that no slug of plastic material is formed in the orifices 168 and 170. In this way, there is no waste of the molten plastic material. There is also no plastic material which can get between components and interfere with the operation of the gating member 166.

Figure 13:
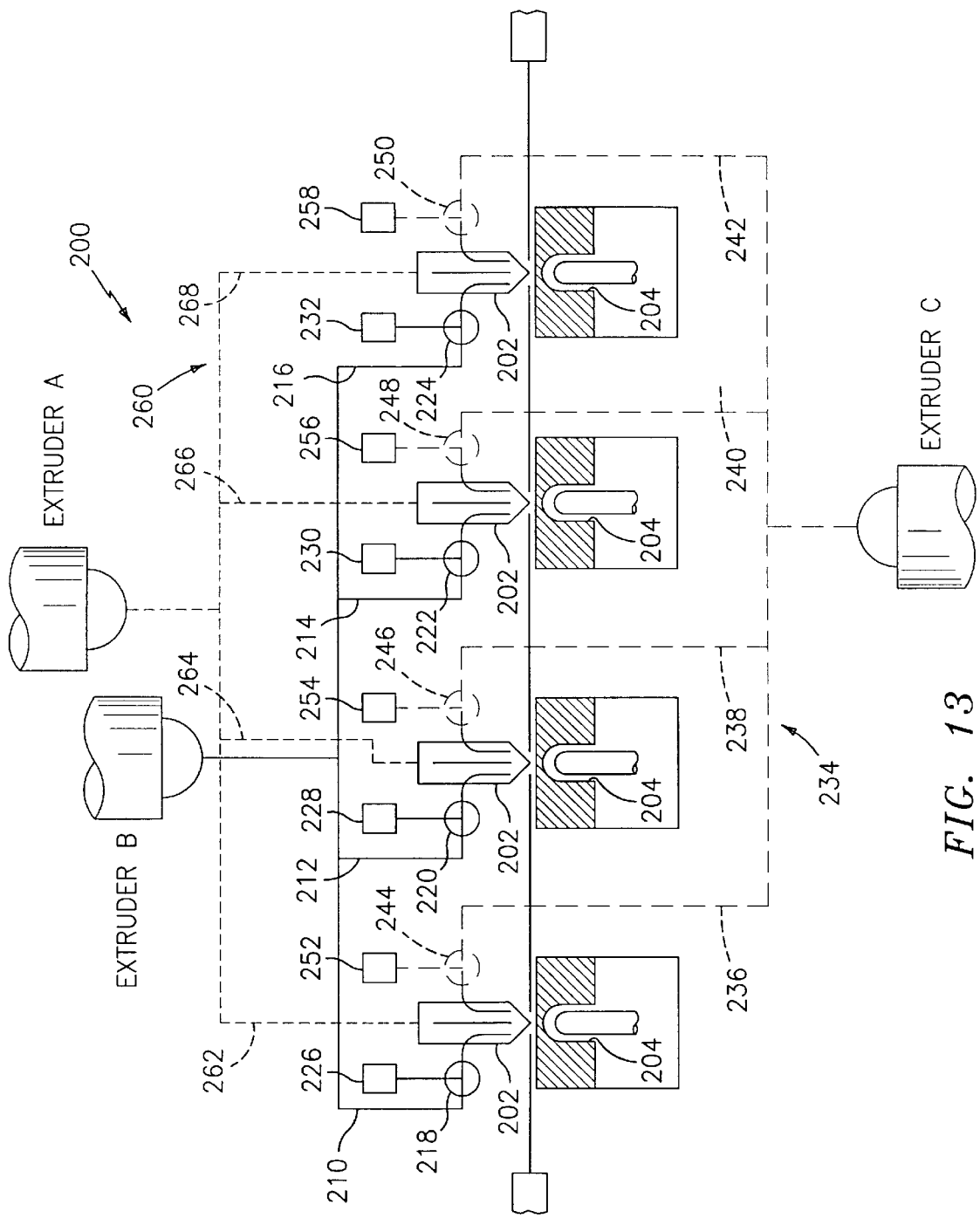
FIG. 13 is a perspective view of a three-material hot runner nozzle system including a valve gating arrangement in accordance with the present invention.
Figure 21:
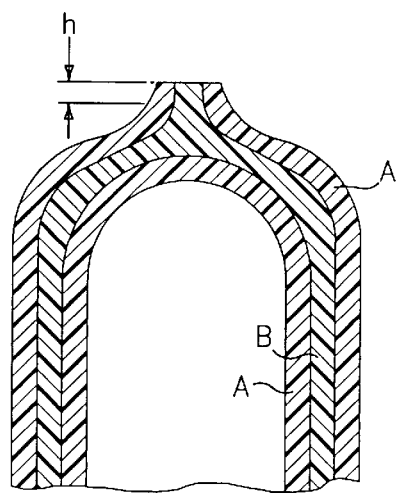
FIG. 21 is a sectional view of a two material preform fabricated using the system of FIG. 19.

It has been found that the valve gating arrangements of the present invention have particular utility in injection molding systems wherein multiple materials are to be fed into a mold cavity space to form multimaterial articles such as the multimaterial preforms shown in FIGS. 18 and 21. Referring now to FIG. 13, an injection molding system 200 is illustrated which can form articles made of three different materials. The system 200 is described in U.S. Pat. No. 4,863,665, which is incorporated by reference herein. The system 200 includes three sources of molten material, namely extruders A, B, and C. The portion of the hot runner system leading from extruder B is shown in solid lines, that portion of the system originating with extruder C is shown in dashed lines, and that portion of the system originating with extruder A is shown in dotted lines. In a typical operation, a first material from extruder A, such as virgin PET to form the exterior surface of the article, is first injected into the mold cavity space 204. Thereafter, a second material from extruder C, such as EVOH barrier resin, is injected into the mold cavity space 204. Thereafter, a third material from extruder B, such as reground PET or any other desired filler resin, is injected into the mold cavity space 204.

Extruder B supplies a heated manifold 206 with molten material B which, in turn, communicates with the injection nozzles 202 via hot runners or channels 210, 212, 214, and 216, respectively. The reference numerals 218, 220, 222, and 224 designate spool valves which operate to control charging of shooting pots or injection cylinders 226, 228, 230 and 232.

Correspondingly, hot manifold 234, supplying a second material C, leads from extruder C to each nozzle 202 via hot runners or channels 236, 238, 240 and 242. Spool valves 244, 246, 248, and 250 control charging of shooting pots 252, 254, 256, and 258.

Hot manifold 260, supplying a third material A, leads from extruder A directly to each nozzle 202 via hot runners 262, 264, 266, and 268.

The operation of the system to supply the three materials to the nozzles 202 is more fully explained in the '665 patent and will not be repeated herein.

Referring now to FIG. 14, it can be seen that each injection nozzle includes three passageways 270, 272, and 274 for the materials B, A, and C respectively. The passageways 270, 272, and 274 each terminate in an opening 276, 278 and 280 respectively. Further, the central axis of the passageway 270 is separated from the central axis of the passageway 272 by a distance $D_{AB}$ and the central axis of the passageway 272 is separated from the central axis of the passageway 274 by a distance $D_{AC}$. The system further includes a mold gate 282 for permitting the molten materials to flow into the mold cavity space 204.

The system 200 however differs from the system shown in U.S. Pat. No. 4,863,665 in that it includes a laterally movable valve gating blade 284 in accordance with the present invention. As shown in FIGS. 14 and 15, the blade 284 is positioned between the injection nozzle outlets 276, 278 and 280 and the mold gate 282. As before the blade 284 is sufficiently thin that during movement of the valve gating blade 284 substantially no molten material is carried by it.

The blade 284 may be provided with an orifice 286 for each injection nozzle 202. The blade may be laterally moved by cylinders (not shown) so that each orifice 286 is sequentially aligned with the outlets 276, 278 and 280 in a respective injection nozzle 202. One sequence which may be used is to align each orifice 286 with outlet 278 so that material A is fed into the mold gate 282 and thus the mold cavity space 282. Thereafter, each orifice 286 is moved into alignment with outlet 276 so that material B is fed into the mold cavity space 204 via mold gate 282. Thereafter, each orifice is aligned with outlet 280 so that material C flows into the mold cavity space 204 via mold gate 282. Finally, the blade 284 may be moved to a position where each orifice 286 is not aligned with any of the outlets 276, 278 and 280 in a respective injection nozzle 202 and flow of the molten materials to the mold cavity spaces 204 is interrupted.

As shown in FIG. 16, the valve gating blade 284 may have sections with three orifices 290, 292, and 294 separated by certain distances $D_{AB}$ and $D_{AC}$ which allow the aforementioned injection sequences as well as the following sequences: inject C/inject A+B or inject A+B/inject C or inject A-B-C sequentially.

Figure 17:
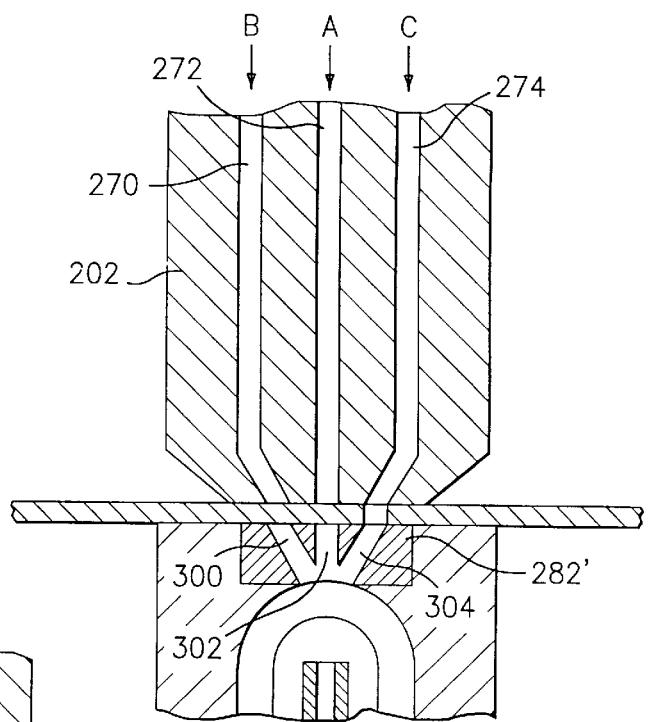
FIG. 17 is a sectional view of a three slotted mold gate to be used with the three-material nozzle of FIG. 16.

FIG. 17 illustrates another type of mold gate 282' which can be used with the injection nozzle of FIG. 14. As shown therein, the mold gate 282' may have three passageways 300, 302 and 304 which align with the outlets 276, 278, and 280 respectively.

FIG. 18 illustrates a three material preform formed by materials A, B, and C which can be manufactured using the system of FIGS. 13–16.

Figure 19:
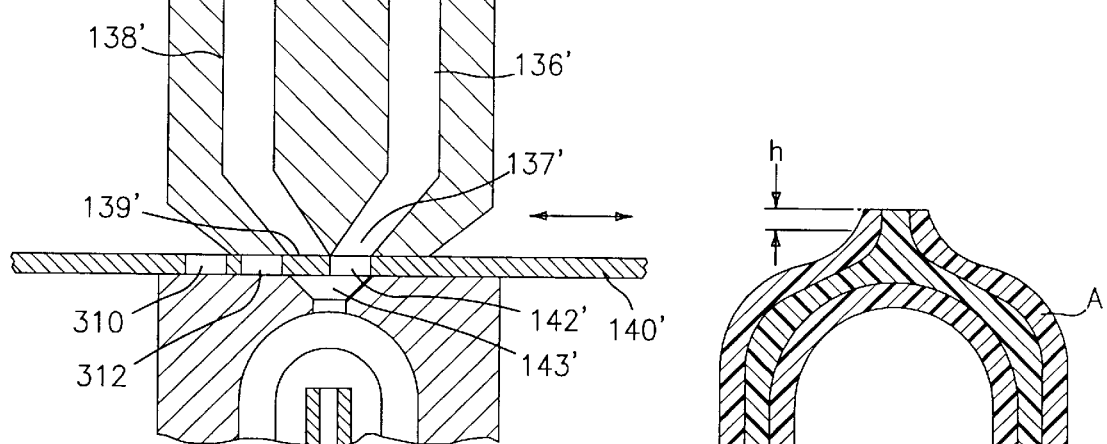
FIG. 19 is a sectional view of another two material nozzle system having a valve gating arrangement in accordance with the present invention.
Figure 20:
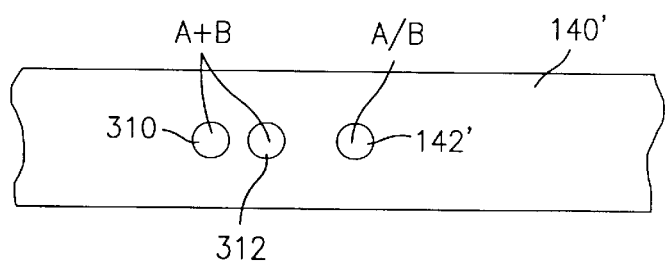
FIG. 20 is a top view of a valve gate blade used in the system of FIG. 19.

Referring now to FIG. 19, this figure illustrates an injection nozzle 134' for injecting two materials A and B. The injection nozzle 134' is similar to that shown in FIG. 10 and has passageways 136' and 138' terminating in outlets 137' and 139' respectively. Materials A and B are fed into a mold cavity space via the outlets 137' and 139' and the mold gate 143'. As before, the valve gating blade 140' has an orifice 142' for permitting sequential injection of the materials A and B. As shown in FIGS. 19 and 20, the blade 140' may also be provided with a section having two orifices 310 and 312 arranged to allow simultaneous feeding of materials A and B. Such an arrangement may be used to perform the following injection sequences: (1) inject A/inject A+B; and (2) inject B/inject A+B. The valve gating blade 142' may be used to perform still other sequences. A two material preform which can be manufactured using the gate valve arrangement of FIGS. 19 and 20 is shown in FIG. 21.

There are some resin materials which require additional heat and better temperature control during injection. In such instances, it is desirable to provide the valve gating arrangement with a heater and a thermocouple. While how this can be done will be discussed in the context of one of the aforementioned embodiments, it should be recognized that a heater and thermocouple arrangement could be incorporated into any of the valve gating arrangements described herein.

Figure 22:
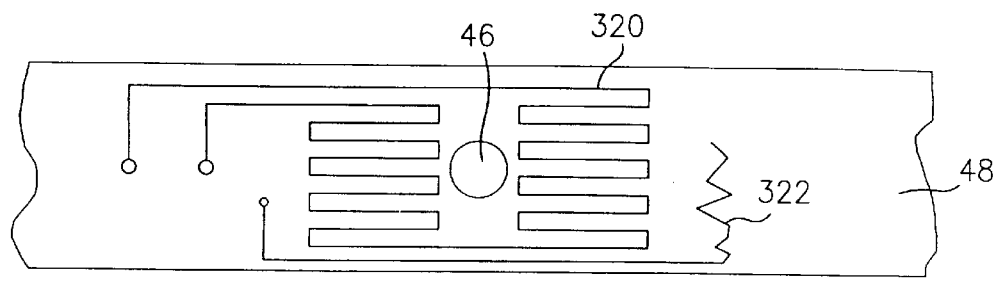
FIG. 22 is a schematic representation of a valve gating blade having a thermocouple and a heater incorporated therein.

Referring now to FIG. 22, a lateral valve gating blade 48 may be provided with a heater 320, such as a thin film heater, and a thermocouple 322 on one of its surfaces. The heater 320 may be used to insure that the resin material receives the heat that it needs to be properly injected. The thermocouple 322 provides a measurement of the temperature in the vicinity of the orifice 46 and thereby allows the injection system to achieve the goal of better temperature control. The thermocouple 322 may be any suitable thermocouple known in the art, such as a thin film thermocouple. The heater 320 and the thermocouple 322 may be attached or deposited on a surface of the blade 48 in any suitable manner known in the art.

Figure 23A:
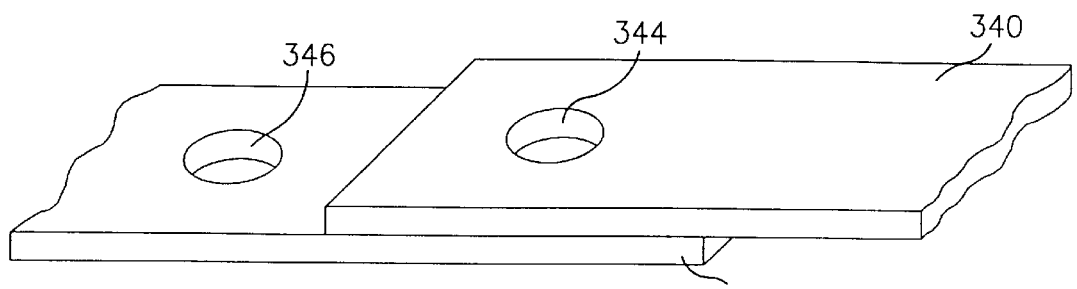
FIGS. 23A–23C illustrate a two blade valve gating arrangement.
Figure 23B:
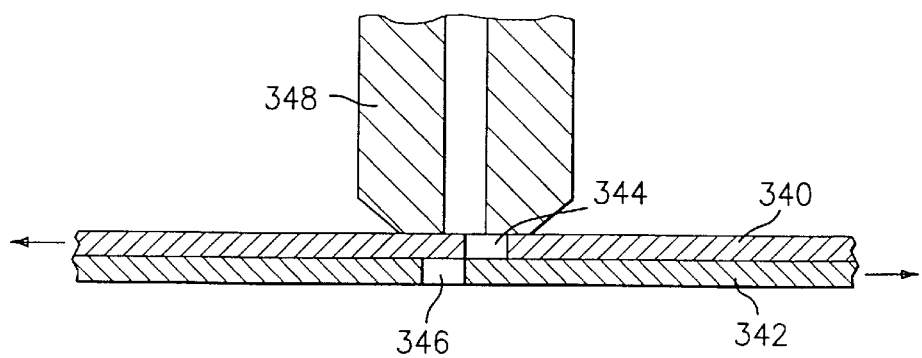
Figure 23C:
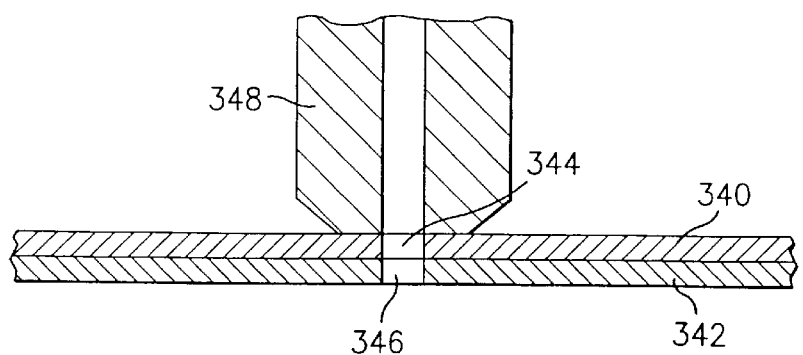

Referring now to FIGS. 23A–23C, instead of using a single valve gating blade, it may be desirable for some applications to use two blades 340 and 342 which are moved in opposite directions. As shown in the figures, the blades 340 and 342 each have an orifice 344 and 346, respectively. The blades 340 and 342 may be moved from a first position (FIG. 23B) where the orifices 344 and 346 are not aligned to a second position (FIG. 23C) where the orifices 344 and 346 are aligned so that material from an injection nozzle 348 is permitted to flow into a mold cavity space (not shown). Any suitable means (not shown) known in the art may be used to move the blades 340 and 342 between the first and second positions. It is believed that this approach provides more flexibility in choosing the optimum thickness of the blades to prevent formation of a slug.

Figure 24A:
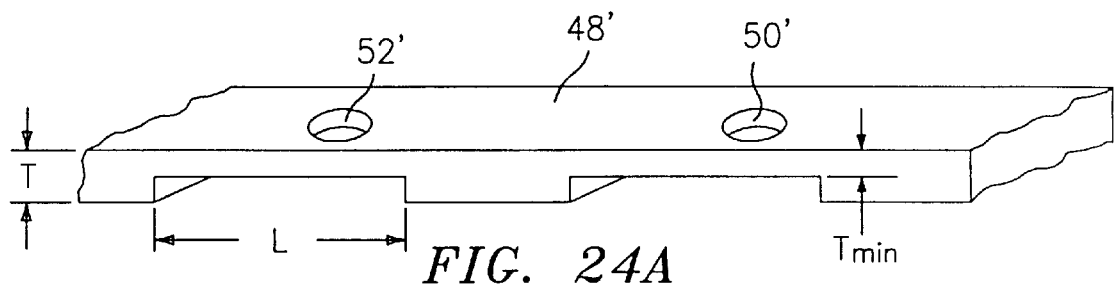
FIGS. 24A–24C illustrate the use of a valve gate blade having multiple thicknesses.
Figure 24B:
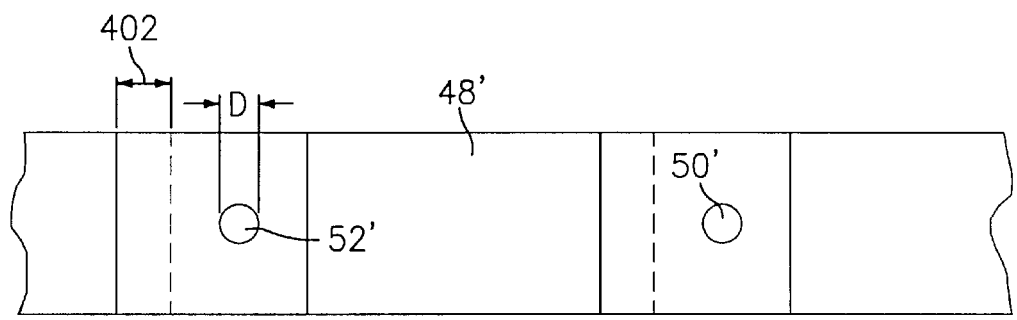
Figure 24C:
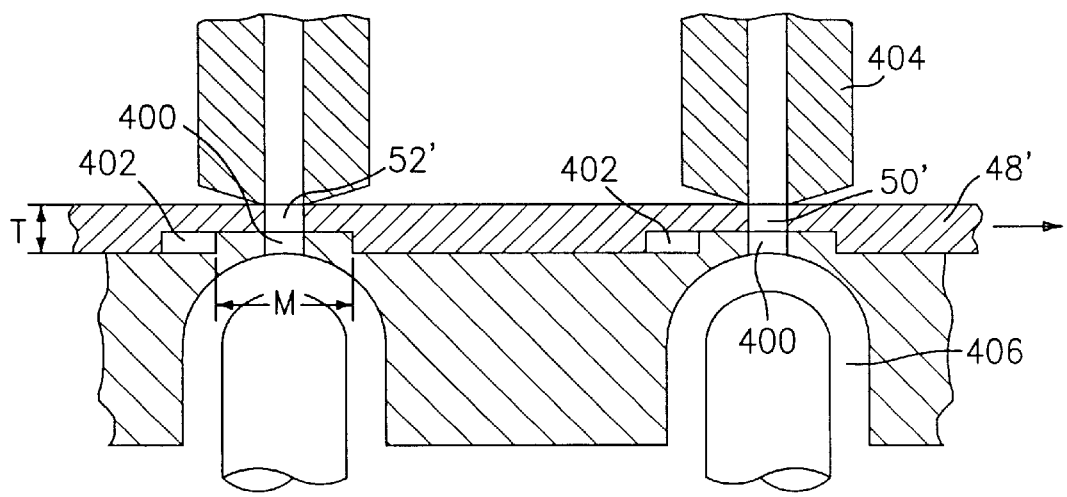

While the various blade configurations have been shown as having a constant thickness, it is possible to use a blade such as that shown in FIGS. 24A–C that has multiple thicknesses T and $T_{min}$. This is because in some applications, the critical thickness $T_{min}$ needed to prevent formulation of a slug need only be in the vicinity of the mold gate and its orifice 400. In such a configuration, the first thickness T is chosen so as to give the blade 48' sufficient strength during lateral movement to avoid its bending. The second thickness $T_{min}$, needed to avoid formation of a slug, is localized in a portion of the blade in the vicinity of each mold gating orifice 400. Those portions of the blade 48' which have the thickness $T_{min}$ include the blade orifices 50', 52'. As previously discussed, the second thickness is selected to prevent formation of a slug. It also can vary the function of the injection parameters or material to be molded.

As can be seen from FIGS. 24A and C, the thickness $T_{min}$ extends a length L which is larger than the extent M of the gate orifice 400. This provides the formation of a clearance 402 which is at least slightly larger than the diameter D of the orifices 50', 52' so as to allow lateral movement of the blade 48' from a valve open position where molten material can flow through the nozzle outlet 404 into the mold cavity space 406 via the mold gating orifice 400 to a valve closed position where such flow is stopped without any leakage after each injection step. As can best be seen from FIG. 24B, the orifices 50' and 52' are offset with respect to the midpoint of length L because of the need to provide the clearance 402.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for injection molding articles, which comprises the steps of:

feeding at least one molten material from an injection nozzle via at least one nozzle outlet to a mold cavity space of an injection mold through a mold gate substantially in line with said at least one nozzle outlet; and eliminating waste of said molten material during molding by positioning a thin, movable valve gating means with an orifice therein between the mold gate and said at least one nozzle outlet, and moving said valve gating means between a first position wherein said orifice communicates with said at least one nozzle outlet and mold gate and permits the flow of molten material from said at least one outlet to said mold gate, and a second position blocking flow from said at least one nozzle outlet to said mold gate without said molten material being transferred by said thin, valve gating means, during movement of said valve gating means between said first and second positions.

2. A method according to claim 1, wherein said positioning step comprises providing a valve blade having an orifice and said moving step comprises laterally sliding said valve blade.

3. A method according to claim 1, wherein the step of positioning comprises positioning a valve blade having a thickness of from 0.01 to 2 mm.

4. A method according to claim 1, including defining the thickness $T_{min}$ of said valve gating means by the equation:

$$T_{min}=4V_{min}/(\pi D^2) \tag{1}$$

where $T_{min}$=minimal thickness;

$V_{min}$=minimal volume of orifice; and

D=diameter of the orifice.

5. A method according to claim 2, including laterally sliding said blade in a direction substantially perpendicular to the mold gate.

6. A method according to claim 1, whereby plastic articles are formed with substantially no crystallinity in the area of the mold gate.

7. A method according to claim 1, whereby plastic articles are formed in said mold cavity space with a portion of said articles contacting said valve gating means, wherein the portion of said articles in contact with said valve gating means is substantially flat and substantially no knit lines are formed in said articles.

8. A method according to claim 2, including the step of moving said blade by actuation means located on at least one side of said blade.

9. A method according to claim 1, including the step of providing a limited clearance between the injection nozzle and mold which permits the valve gating means to move without leakage of plastic.

10. A method according to claim 1, including the step of lining each valve gating means orifice with a material which is different from the material of the valve gating means.

11. A method according to claim 1, including the step of providing a divider in the valve gating means orifice to provide a split orifice.

12. A method according to claim 2, including the step of carrying a plurality of blades by a frame.

13. A method according to claim 1 wherein said positioning step comprises providing a disk having at least one orifice between said nozzle outlet and said mold gate and said moving step comprising rotating said disc between said first and second positions.

14. A method according to claim 1 further comprising:

said injection nozzle having a plurality of outlets;

said positioning step comprising providing a rotatable member having a number of orifices equal to the number of said outlets; and said moving step comprising rotating said rotatable member between said first and second positions.

15. A method according to claim 1 further comprising:

providing an injection nozzle having a plurality of passageways for accommodating different materials to be molded, each passageway terminating in a nozzle outlet;

said positioning step comprising positioning a thin, laterally movable valve blade having a single orifice between the mold gate and said nozzle outlets; and sequentially feeding said different materials to said mold gate by moving said blade between positions where said orifice is sequentially aligned with different ones of said outlets.

16. A method according to claim 1 further comprising:

providing an injection nozzle having a plurality of passageways for accommodating different materials to be molded, each passageway terminating in a nozzle outlet;

said positioning step comprising positioning a thin, laterally movable valve blade having a plurality of orifices between the mold gate and said nozzle outlets; and sequentially feeding said different materials to said mold gate by moving said blade between positions where one of said orifices is sequentially aligned with different ones of said outlets.

17. A method according to claim 16 further comprising:

simultaneously feeding different materials to said mold gate by moving said blade to a position where multiple ones of said orifices are aligned with multiple ones of said outlets.

\* \* \* \* \*